United States Patent
Zwick

(10) Patent No.: US 11,166,586 B2
(45) Date of Patent: Nov. 9, 2021

(54) MILK FOAMING DEVICE HAVING A RETURN LOOP

(71) Applicant: ÜBERMORGEN INNOVATIONS GMBH, Aachen (DE)

(72) Inventor: Boris Zwick, Stutensee (DE)

(73) Assignee: Ubermorgen Innovations GMBH

( * ) Notice: Subject to any disclaimer, the term of this patent is extended or adjusted under 35 U.S.C. 154(b) by 424 days.

(21) Appl. No.: 16/074,123

(22) PCT Filed: Mar. 9, 2017

(86) PCT No.: PCT/EP2017/055572
§ 371 (c)(1),
(2) Date: Jul. 31, 2018

(87) PCT Pub. No.: WO2017/153533
PCT Pub. Date: Sep. 14, 2017

(65) Prior Publication Data
US 2020/0069107 A1    Mar. 5, 2020

(30) Foreign Application Priority Data
Mar. 10, 2016   (DE) ..................... 10 2016 104 404.0

(51) Int. Cl.
A47J 31/44   (2006.01)
A47J 31/46   (2006.01)
A47J 31/52   (2006.01)

(52) U.S. Cl.
CPC ......... *A47J 31/4485* (2013.01); *A47J 31/461* (2018.08); *A47J 31/469* (2018.08); *A47J 31/5253* (2018.08)

(58) Field of Classification Search
CPC .. A47J 31/4485; A47J 31/461; A47J 31/5253; A47J 31/469
(Continued)

(56) References Cited

U.S. PATENT DOCUMENTS 3,094,060 A  *  6/1963  Menoret ................... A23L 2/42
                                                    99/493
3,428,413 A  *  2/1969  Froelich .................. B65B 3/003
                                                    422/111
(Continued)

FOREIGN PATENT DOCUMENTS

DE   102008058934 A1   5/2010
DE   202011000505 U1   10/2011

OTHER PUBLICATIONS

International Search Report, PCT/EP2017/055572, dated Jun. 12, 2017, 2 pages.
(Continued)

*Primary Examiner* — Phuong T Nguyen
(74) *Attorney, Agent, or Firm* — Stinson LLP

(57) ABSTRACT

A milk foaming device comprising a milk channel for conducting milk in a milk flow direction from a milk container to a milk outlet head, a foaming section for converting the milk in the milk channel into a milk foam that contains air, a temperature control element for controlling the temperature of the milk foam from the foaming section, and a return channel that branches off from the milk channel between the temperature control element and the milk outlet head and leads, when viewed in the milk flow direction, to a point in the milk channel upstream of the temperature control element.

16 Claims, 4 Drawing Sheets

(58) Field of Classification Search
USPC ......... 99/281, 286, 295, 300, 330, 403, 408, 99/472, 493, 453
See application file for complete search history.

(56) References Cited

U.S. PATENT DOCUMENTS

| | | |
|---|---|---|
| 5,464,124 A | 11/1995 | Weyh et al. |
| 5,780,087 A | 7/1998 | Brady |
| 2010/0295194 A1 | 11/2010 | Bodum et al. |
| 2014/0299001 A1* | 10/2014 | Rimpl .................... A47J 31/44 99/323.1 |

OTHER PUBLICATIONS

Written Opinion, PCT/EP2017/055572, dated Jun. 12, 2017, 5 pages.

* cited by examiner

MILK FOAMING DEVICE HAVING A RETURN LOOP

REFERENCE TO RELATED APPLICATIONS

This application is a US national stage application based on PCT/EP2017/055572 filed Mar. 9, 2017, and claims priority to DE 10 2016 104 404.0 filed Mar. 10, 2016, the entire disclosures of which are expressly incorporated herein by reference.

FIELD OF INVENTION

The present invention relates to a milk foaming device.

BACKGROUND

A milk foaming device is known from DE 10 2008 058 934 B4. The milk foaming device comprises a milk channel to lead milk in a milk flow direction from a milk container to a milk outlet head, a foaming section in the milk channel to convert the milk in the milk channel into a milk foam that contains air, and a temperature control element to control the temperature of the milk foam from the foaming section.

DE 10 2008 058 934 B4 teaches the interruption of the flow of the milk foam in the milk channel with a solenoid valve after the temperature control element.

SUMMARY OF THE INVENTION

It is object of the invention to improve the known milk foaming device.

According to one aspect of the invention, a milk foaming device comprises a milk channel to lead milk in a milk flow direction from a milk container to a milk outlet head, a foaming section in the milk channel to convert the milk in the milk channel into a milk foam that contains air, and a temperature control element to control the temperature of the milk foam from the foaming section, and a return channel that branches off from the milk channel between the temperature control element and the milk outlet head, when viewed in the milk flow direction, to a point in the milk channel upstream of the temperature control element.

The said milk foaming device is based on the idea that the interruption of the milk flow in the state of the art leads to milk and/or the milk foam remaining in the temperature control element. This may lead to the interruption of the milk resulting in the milk flow being changed chemically and, for example, burning. Resulting deposits, such as burn residues in the milk foaming device, are either flushed out with the milk flow when the milk foaming device is turned on again, or they contaminate the milk foaming device sooner or later.

The said milk foaming device solves this problem with the proposal of not interrupting the milk flow, but keeping it circulating using a return loop. For this purpose, the return channel is designed to keep the milk flowing, even after the milk foaming device has been turned off, at least as long as the temperature control element has adjusted to appropriate storage conditions so that no residues are formed.

In one embodiment, the said milk foaming device comprises a shut-off element that is designed in such a way as to lock the return channel. In this way, the return channel can be deactivated in normal operation, i.e. when the milk foaming device is used to foam milk.

In a favourable embodiment of the indicated milk foaming device, the shut-off element is a switch element to lead the milk foam either to the milk outlet head or into the return channel. In this way, the milk flow can be guided in a targeted manner.

In a particularly advantageous embodiment, the indicated milk foaming device comprises an additional switch element that is designed in such a way as to open the milk channel either to the return channel or to the milk container. Alternatively, this additional switch element can also be used instead of the first switch element. This solution is particularly favourable, because this design does not require a back-pressure valve that would be necessary to avoid that the milk foaming device does not run dry upstream of the foaming section and/or the temperature control element after being turned off.

In a preferred embodiment of the indicated milk foaming device, the switch element and/or the additional switch element is a three-way valve that can be installed easily into the milk channel with little assembly space.

In a particularly preferred embodiment of the indicated milk foaming device, the three-way valve is magnetic and can be used at a high switching speed.

In another embodiment of the indicated milk foaming device, an air duct in the foaming section leads into the milk channel to enrich the milk with air. This air duct can be used, for example, on the basis of the Venturi effect. In this way, the air which is needed to foam the milk can easily be led into the milk channel.

In an additional embodiment of the indicated milk foaming device, the foaming section comprises, when viewed in the milk flow direction, a swirling element downstream of the air duct to swirl the air in the milk. This swirling element can be, for example, a gear pump which easily swirls the milk mixed with air to create milk foam.

For this purpose, the return channel between the air duct and the swirling element can lead into the milk channel, so that the swirling element can also be used to maintain the milk flow in the milk channel and in the return channel at the same time.

BRIEF DESCRIPTION OF THE DRAWINGS

The above-described properties, features and advantages of this invention, as well as the manner in which they are achieved, will become clearer in connection with the following description of the embodiments, which are described in more detail in connection with the drawings.

Figure 1:
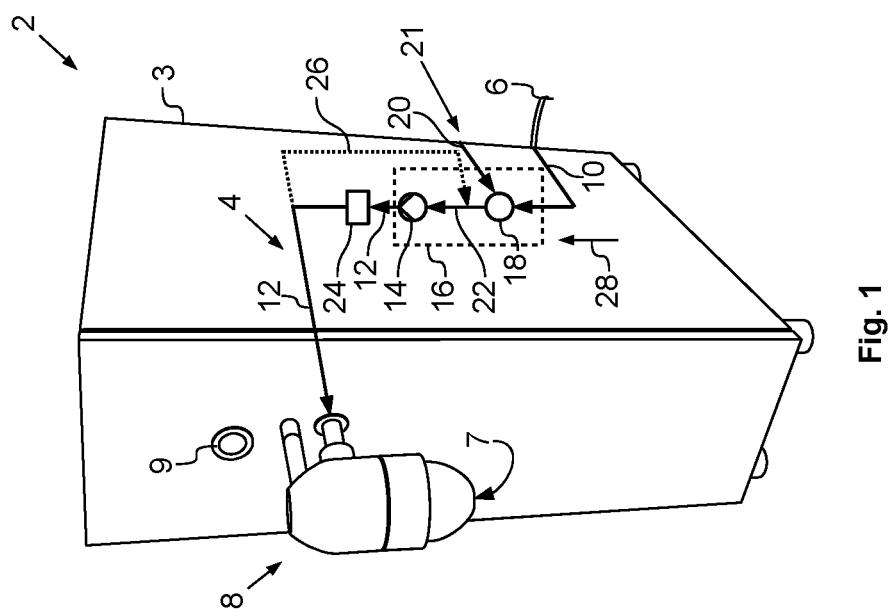
FIG. 1 is a perspective view of a milk foaming device with a milk outlet head.

In the drawings, same technical elements are provided with same reference signs, and are only described once. The drawings are purely schematic, and, in particular, do not reflect any geometric proportions.

DETAILED DESCRIPTION OF PREFERRED EMBODIMENTS

Reference is made to FIG. 1 showing a perspective view of a milk foaming device 2. The individual elements inside the milk foaming device 2 are only indicated in a structural manner.

The milk foaming device 2 comprises a milk channel 4 extending through a housing 3 and starting from a milk suction tube 6 to an outlet opening 7 of a milk outlet head 8. To operate the milk foaming device 7, a control knob 9 on the housing 3 of the milk foaming device 2 is pressed to suck milk 10 through the milk suction tube 6 from a milk container, which is not shown in any further detail, into the milk channel 4, and processed to a milk foam 12 and dispensed at the outlet opening 7 on the milk outlet head 8.

To produce the milk foam 12, a pump 14 sucks in milk 10 in a foaming section 16. A Venturi nozzle 18 of the foaming section 16 installed before the pump 14 is used to enrich the milk 10 with air 20 via an air duct 21, so that aerated milk 22 enters the pump 14 and is mixed there. This is the basic principle of how the milk foam 12 is generated. In an adjoining temperature control element 24 the milk foam 12 is then reprocessed and, for example, heated, which leads to an expansion of the air bubbles contained in the milk foam 12 and to a stabilisation of the milk foam 12.

Please refer to DE 10 2008 058 934 B4 for further details on the milk foaming device 2. This document includes the proposal of interrupting the milk flow in the milk channel 4 by means of a solenoid valve. The disadvantage here is, however, that the milk foam 12 remains in the temperature control element 24 when the milk flow is interrupted. As it is impossible for the temperature control element 24 to change its temperature suddenly in this case, the milk foam 12 may be damaged and burn for example. This can cause deposits to form in the milk channel 4, which then contaminate the milk channel 4 and/or will be dispensed together with the milk foam 12 from the milk outlet head 8 when the milk foaming device is turned on again.

The present embodiment proposes bypassing the temperature control element 24 using a return channel 26, and feeding the milk foam 12 when viewed in a direction of flow 28 of the milk 10 and of the milk foam 12 upstream of the temperature control element 24 back into the milk channel 4.

This idea shall be described in more detail in the following by means of an organigram of the milk foaming device 2 shown in FIG. 2.

In the present embodiment, the return channel 26 starts in the milk outlet head 8 between a first filter element 30 and a second filter element 32. Viewed from the milk flow direction 28, the first filter element 30 is arranged upstream of the second filter element 32 and, for example, designed as filter cartridge. The second filter element 32 may be a small filter plate.

A first switch element 34 in the form of a magnetic three-way valve is arranged between both filter elements 30, 32. The first switch element 34 receives the milk foam 12 from the first filter element 30 and, depending on its switching state, leads the milk foam 12 either into the return channel 26 or to the second filter element 32. In detail, as seen in FIG. 2 showing the first switching state of the switch element 34, the milk foam 12 is led from the first filter element 30 to the second filter element 32. In a second switching state which is not shown in FIG. 2, the milk foam 12 is led from the filter element 30 into the return channel 26.

On the other side of the return channel 26 opposite to the first switch element 34, a second switch element 36 in the form of a magnetic three-way valve is arranged which, depending on the switching state, leads milk 10 either from the milk suction tube 6 or milk foam 12 from the return channel 26 to the pump 14. In the first switching state shown in FIG. 2, the second switch element 36 leads milk 10 from the milk suction tube 6 to the pump 14.

The switching states of the two switch elements 34, 36 are set via a control signal 38 and a reset element 40. As the mode of operation of magnetic three-way valves is basically known, it will not be described in more detail here.

Figure 3:
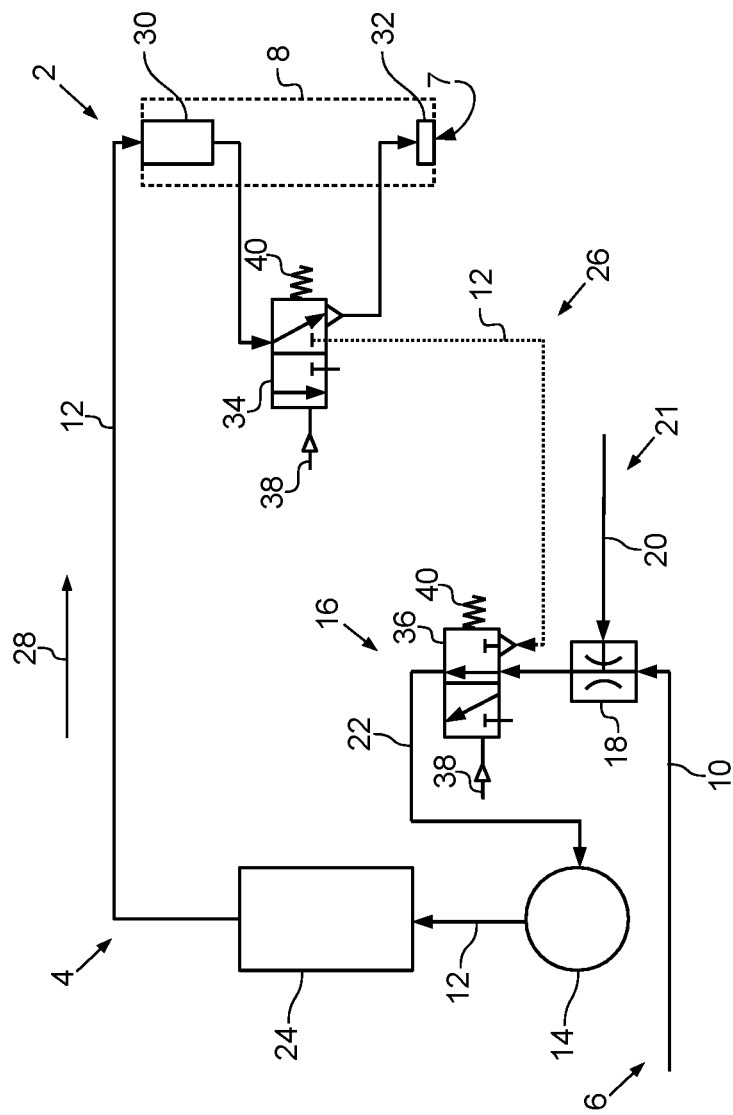
FIG. 3 is a structure view of the milk foaming device of FIG. 2 in a first functional condition.

FIG. 3 shows the milk foaming device 2 in a functional condition with both switch elements 34, 36 in the first switching state. The sections of the milk foaming device 2 separated from the milk flow, i.e. the return channel 26, are displayed as a dotted line.

As can be seen in FIG. 3, the milk foaming device 2 works in the first switching state of the switch elements 34, 36 in a generally known manner, and leads the milk 10 through the foaming section 16, and then dispenses the milk foam 12 via the outlet opening 7 at the milk outlet head 8.

Figure 4:
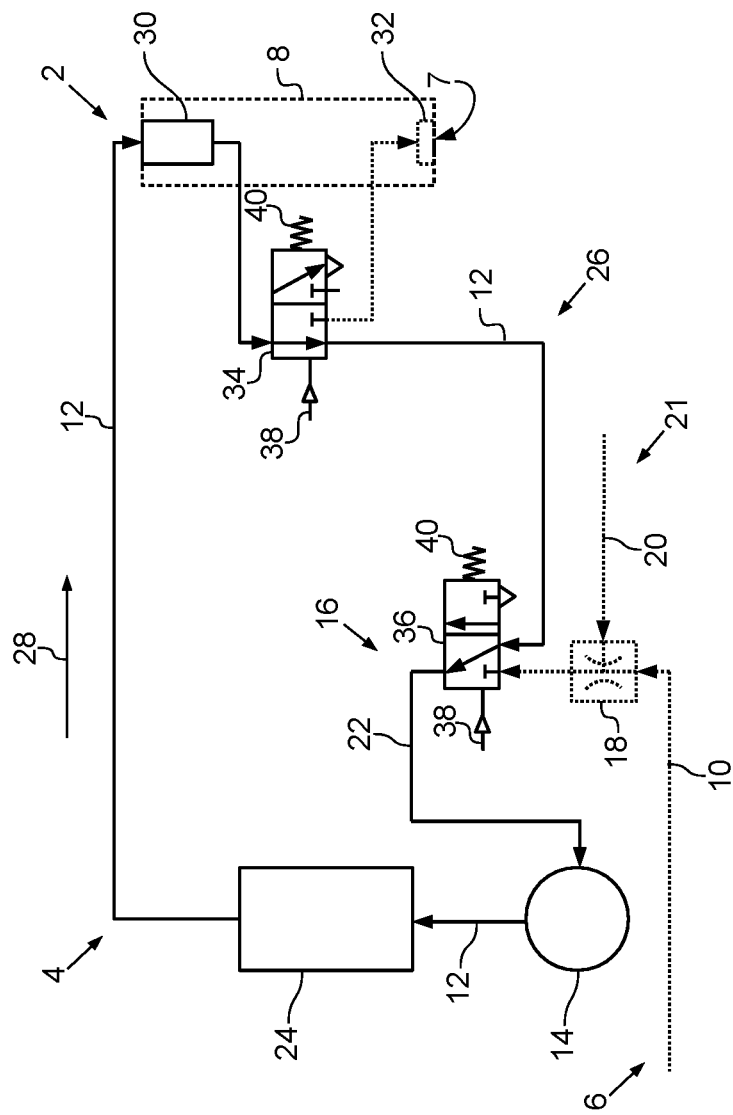
FIG. 4 is a structure view of the milk foaming device of FIG. 2 in a second functional condition.

As soon as the flow of the milk foam 12 from the milk outlet head 8 is to be stopped, both switch elements 34, 36 are set to the second switching state using the control signal 38 as shown in FIG. 4. FIG. 4 also displays the sections of the milk foaming device separated from the milk flow as a dotted line similar to FIG. 3.

As shown in FIG. 4, the milk foam 12 now flows in a circuit comprising the milk channel 4 and the return channel 26. In this circuit 4, the milk foam 12 passes the temperature control element 24 repeatedly. In this way it can be avoided that the milk foam 12 remains in the temperature control element 24 and burns if, for example, the temperature control element 24 is still too hot.

The arrangement of two switch elements 34, 36 ensures that in the functional condition shown in FIG. 4 the circuit 4, 26 is actually closed, and that no milk foam 12 can leave the circuit, either on the side of the milk suction tube 6 or on the side of the milk outlet head 8.

If it is only to be avoided that the milk foam 12 remains in the temperature control element 24 as long as the temperature control element 24 has not yet reached its storage temperature, it is basically sufficient that only the temperature control element 24 is bridged with the circuit 4, 26. The temperature control element 24 acts for the circuit 4, 26 as a thermodynamic drive element and moves the milk foam solely by its difference in temperature to the ambient temperature. As soon as the temperature control element 24 has reached its storage temperature, and the milk foam 12 remaining in the temperature control element 24 can no longer be damaged by the temperature control element 24, the thermodynamic drive is no longer effective. The circuit 4, 26 stops by itself. Therefore, it is not necessary to block the milk flow as in DE 10 2008 058 934 B4.

The pump 14, however, should preferably be integrated into the circuit 4, 26, as shown in FIG. 4. The air 10 is not dissolved in the milk foam 12, and is therefore separated from it in the circuit 4, 26 if the milk foam 12 remains in the circuit 4, 26 for a certain time. If the milk foaming device 2 would then be retransferred into the first functional condition according to FIG. 3, the milk outlet head 8 would now only provide only milk 10 and no milk foam 12.

This can be avoided by integrating the pump 14 into the circuit 4, 26. If the milk 10 separated from the air 20 in the circuit 4, 26 after a longer downtime, the milk foam 12 can be produced again when the milk foaming device 2 is operated for at least one round in the functional condition according to FIG. 4 until the milk foaming device 2 is switched back to the functional condition according to FIG. 3.

Figure 2:
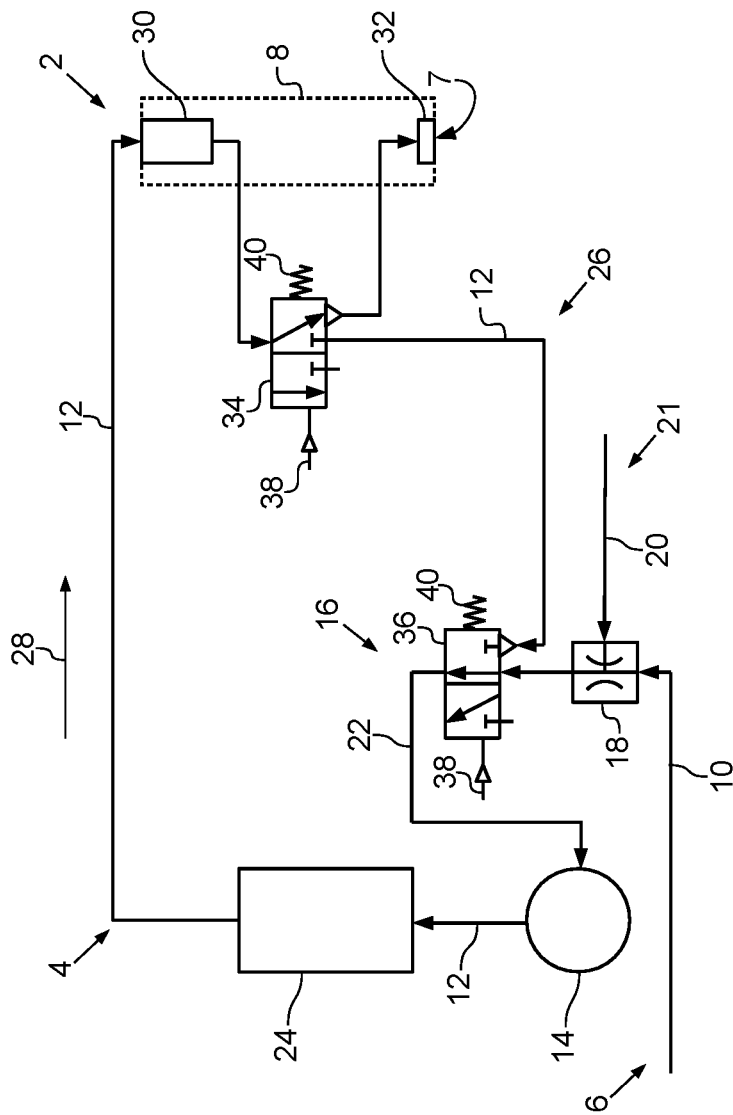
FIG. 2 is a structure view of the milk foaming device of FIG. 1.

The result is that the milk foaming device 2 shown in FIG. 2 should be switched back according to FIG. 3 to the functional condition according to FIG. 4 at least before it is completely turned off electrically. If the milk foaming device 2 is turned on again, it should first be operated in the functional condition according to FIG. 4 for a while, before being switched back to the operating state of FIG. 3 to provide milk foam 12.

The two filter elements 30, 32 are optional.

The invention claimed is:

1. A milk foaming device comprising
a milk channel to guide milk in a milk flow direction from a milk container to a milk outlet head,
a foaming section to convert the milk in the milk channel into a milk foam that contains air,
a temperature control element to control the temperature of the milk foam from the foaming section, and
a return channel configured to bypass the temperature control element, the return channel branching off from the milk channel between the temperature control element and the milk outlet head, when viewed in the milk flow direction, to a point in the milk channel upstream of the temperature control element.

2. The milk foaming device as claimed in claim 1, comprising a shut-off element that is designed to close the return channel.

3. The milk foaming device as claimed in claim 2, wherein the shut-off element is a switch element to lead the milk foam either to the milk outlet head or into the return channel.

4. The milk foaming device as claimed in claim 3, comprising an additional switch element which is designed to open the milk channel either towards the return channel or to the milk container.

5. The milk foaming device as claimed in claim 4, wherein the switch element is a three-way valve.

6. The milk foaming device as claimed in claim 5, wherein the three-way valve is magnetic.

7. The milk foaming device as claimed in claim 3, wherein the switch element is a three-way valve.

8. The milk foaming device as claimed in claim 7, wherein the three-way valve is magnetic.

9. The milk foaming device as claimed in claim 4, wherein an air duct to enrich the milk with air leads into the milk channel in the foaming section.

10. The milk foaming device as claimed in claim 9, wherein the foaming section when viewed in the milk flow direction comprises a swirling element downstream of the air duct to swirl the air in the milk.

11. The milk foaming device as claimed in claim 10, wherein the return channel between the air duct and the swirling element leads into the milk channel.

12. The milk foaming device as claimed in claim 4, wherein the additional switch element is a three-way valve.

13. The milk foaming device as claimed in claim 1, wherein an air duct to enrich the milk with air leads into the milk channel in the foaming section.

14. The milk foaming device as claimed in claim 13, wherein the foaming section when viewed in the milk flow direction comprises a swirling element downstream of the air duct to swirl the air in the milk.

15. The milk foaming device as claimed in claim 14, wherein the return channel between the air duct and the swirling element leads into the milk channel.

16. A milk foaming device comprising:
a milk channel to guide milk in a milk flow direction from a milk container to a milk outlet head,
a foaming section to convert the milk in the milk channel into a milk foam that contains air, the milk outlet head having an outlet opening through which the milk foam is dispensed,
a temperature control element to control the temperature of the milk foam from the foaming section,
a first filter element to filter the milk foam before dispensing at the outlet opening of the milk outlet head, and
a return channel that branches off from the milk channel between the temperature control element and the milk outlet head to bypass the outlet opening of the milk outlet head downstream of the first filter element, when viewed in the milk flow direction, to a point in the milk channel upstream of the temperature control element.

* * * * *